W. E. J. ANDERSON.
FARM WAGON.
APPLICATION FILED JAN. 17, 1912.
1,043,659.
Patented Nov. 5, 1912.
2 SHEETS—SHEET 2.
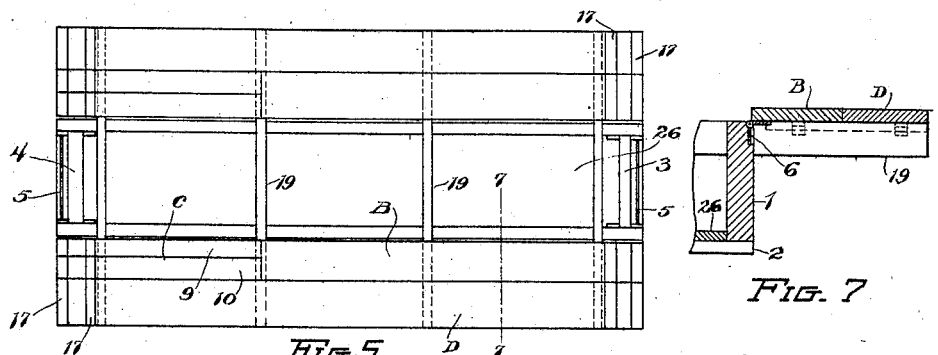
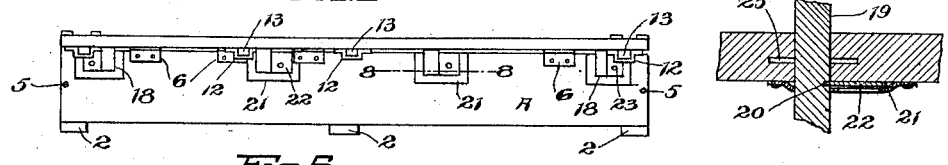
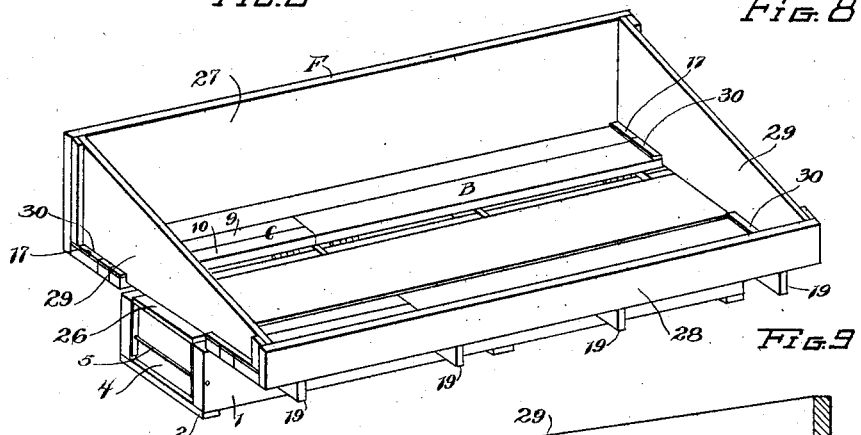
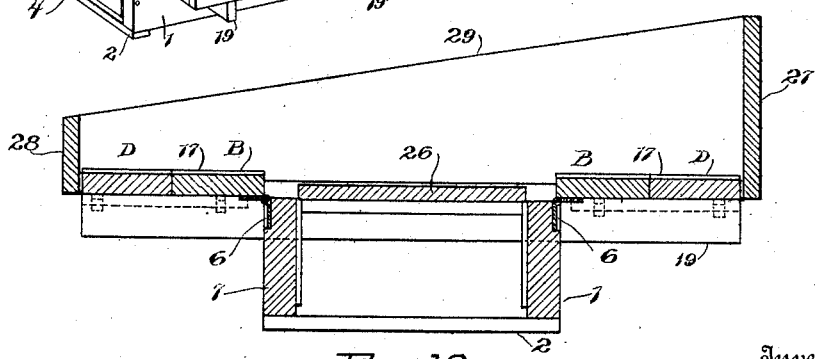
Witnesses
Wm. H. Mulligan.
Inventor
W. E. J. Anderson
By Victor J. Evans
Attorney
COLUMBIA PLANOGRAPH CO., WASHINGTON, D. C.

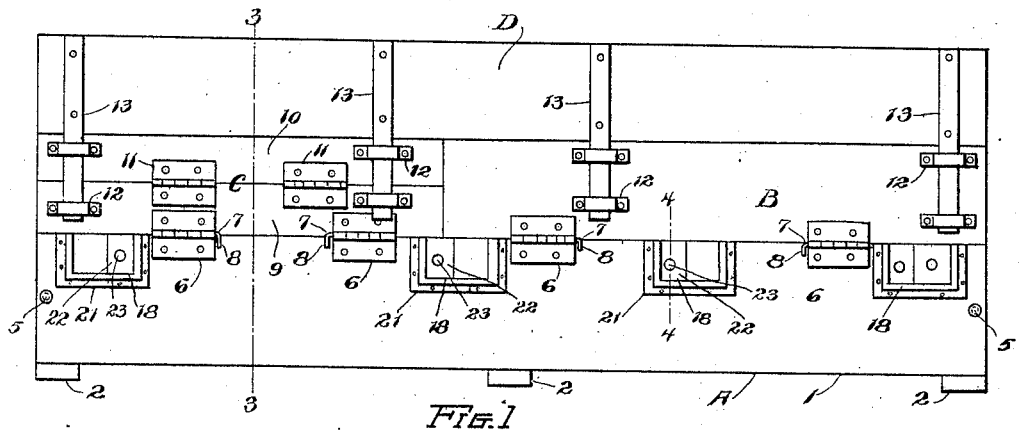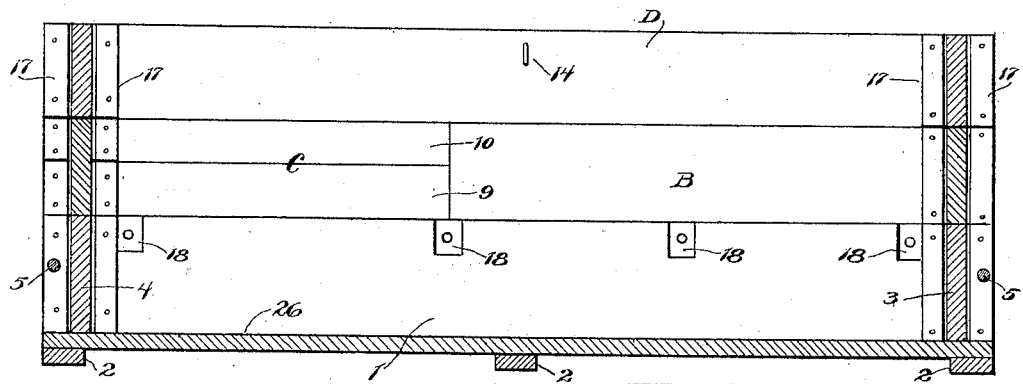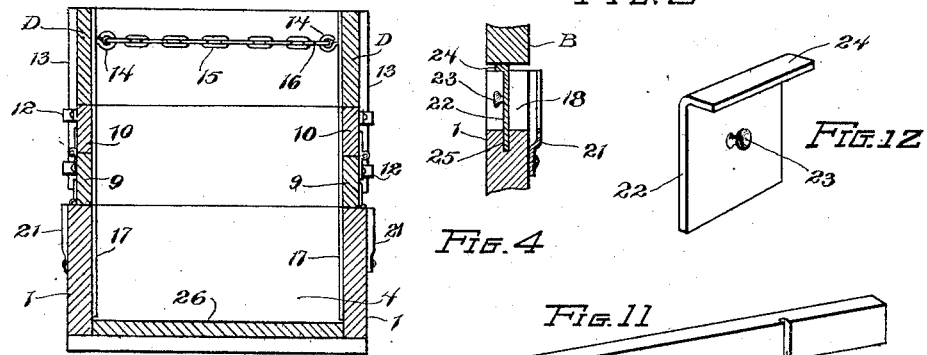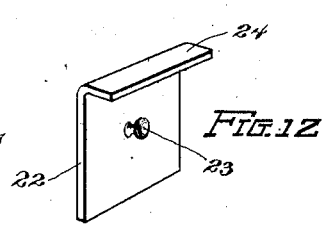

UNITED STATES PATENT OFFICE.

WILLIAM E. J. ANDERSON, OF TRINIDAD, COLORADO.

FARM-WAGON.

1,043,659.  Specification of Letters Patent.  Patented Nov. 5, 1912.

Application filed January 17, 1912. Serial No. 671,600.

*To all whom it may concern:*

Be it known that I, WILLIAM E. J. ANDERSON, a citizen of the United States, residing at Trinidad, in the county of Las Animas and State of Colorado, have invented new and useful Improvements in Farm-Wagons, of which the following is a specification.

This invention relates to farm wagons, and it has for its object to produce a wagon box or bed which may be easily and quickly converted so as to be capable of being used as an ordinary wagon box, as a hay rack and for other purposes.

A further object of the invention is to produce a device of the class described which in combination with a suitable frame structure will form a header bed adapted to receive the heads of grain discharged from a header.

Further objects of the invention are to simplify and improve the construction and operation of a device of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side view of a wagon box constructed in accordance with the invention. Fig. 2 is a longitudinal sectional view of the same. Fig. 3 is a transverse sectional view taken on the line 3—3 in Fig. 1. Fig. 4 is a sectional detail view taken on the line 4—4 in Fig. 1. Fig. 5 is a top plan view showing the device adapted to be used as a hay rack. Fig. 6 is a side elevation of the same. Fig. 7 is a transverse sectional view taken on the line 7—7 in Fig. 5. Fig. 8 is a horizontal sectional detail view taken on the line 8—8 in Fig. 6. Fig. 9 is a perspective view showing the device arranged to be used as a header bed. Fig. 10 is a transverse sectional view of the same. Fig. 11 is a perspective view of one of the supporting bars extending transversely of the wagon box when the latter is used as a hay rack or as a header bed. Fig. 12 is a perspective detail view of one of the closures used in connection with the device.

Corresponding parts in the several figures are denoted by like characters of reference.

The wagon box A is composed of the sideboards 1, 1 which are connected together by means of cross bars or braces 2, 2 upon which said sideboards are mounted. The sideboards are spaced apart by the front and rear gates 3, 4 and are connected together by means of tightening rods 5 adjacent to said gates.

The wagon box is provided with front and rear extension sides B, C which are connected with the upper edges of the sideboards 1 by means of hinges 6 having detachable pintles 7 provided with heads or handles 8, whereby said pintles may be readily removed, for the purpose of detaching the extension sides. The rear extension sides C are composed each of a lower member 9 and an upper member 10 which are connected together by means of ordinary hinges 11. The front and rear extension sides are provided with keepers 12 on their outer faces for the reception of stakes 13 associated with and extending downwardly from the top extensions D which may thus be mounted upon the extension sides B, C. Each of the top extensions D consist of a single plank, and it will be seen that when the said top extensions are mounted upon the extension sides, the members B, C of said extension sides will be connected together. The top extensions D are provided on their inner sides with eyes 14, with one of which a chain 15 is connected, said chain being provided with a terminal hook 16 adapted to engage the opposite eye 14, thereby serving to secure the extension sides of the top extensions of the box in upright or extended position. The members of the extension sides and the top extensions are provided on their inner faces with cleats 17 for the reception of end gates when such are to be used.

The sideboards 1 of the box are provided at their upper edges with notches 18 arranged at suitable intervals, the notches in the two sideboards being formed in alinement with each other. These notches are for the reception of supporting bars 19 which when properly placed in position will serve to support the extension sides of the box when said sides are folded downward in order to convert the device into a hay rack or a header bed, as the case may be. The supporting bars 19 are provided adjacent to the outer faces of the sideboards with vertical grooves 20. Secured exteriorly upon the sideboards 1 adjacent to the notches 18 are frames 21 adapted to receive closures consisting of plates 22 having handles 23 whereby they may be manipulated, said plates being also provided at their upper edges with flanges 24. When the plates 22 are placed in the frames 21, assuming the supporting bars 19 to be positioned in the notches 18, the vertical grooves 20 of said cross bars will be engaged by the proximate edges of the plates, and the cross bars will thus be held securely against displacement. The flanges 24 at the upper edges of the plates will be engaged by the extension sides of the box when said sides are turned down to rest upon the projecting ends of the supporting bars 19, and the plates 22 will thus be held securely against upward displacement.

The side walls of the notches 18 in the sideboards of the wagon box are provided with vertical grooves 25. When the device is to be used as an ordinary wagon box, as shown in Figs. 1, 2 and 3, the closure plates 22 are placed in engagement with said grooves, thereby obstructing the apertures formed by the notches 18 and enabling the wagon box to be used for the transportation of material such as grain and the like.

The bottom 26 of the wagon box is loosely supported on the cross bars. It will be seen that when the extension portions of the sides of the wagon box including the members B, C and D are folded down to rest upon the supporting bars 19, the device may be utilized as a hay rack. When the device is used in this manner, in connection with a wagon having high hind wheels, the members C of the sideboards may be raised out of the way of such wheels, owing to the fact that each of said members is composed of the two parts 9 and 10 which are hingedly connected together. In order to convert the same into a header bed, the movable bottom member 26 is removed from its position upon the cross bars 2 and is transferred to the supporting bars 19 where it is supported between the downturned side members of the box. A frame F is provided, said frame including side members 27, 28 of unequal height and front and rear members 29, whereby said side members are connected in spaced relation, said front and rear members being wedge-shaped, as shown. The front and rear members are provided with notches 30 to engage the downturned side members of the box. Said notched portions are fitted between the cleats 17. The portions of the side members intermediate the notches 30 will engage the upper face of the bottom member 26 directly above the end gates 3 and 4. The side members 27 and 28 of the frame F project downwardly below the lower edges of the front and rear members so as to abut upon the outer edges of the downturned side members of the box, thereby holding the frame against lateral displacement, longitudinal displacement being prevented by the cleats 17 engaging the front and rear end members of the frame. The device when thus arranged forms a convenient header bed for receiving the heads of grain discharged from a header.

As will be seen from the foregoing description, I have provided a combination wagon bed which may be used for a variety of purposes, said device being simple in construction, easily manipulated and thoroughly efficient for the purposes for which it is provided.

Having thus described the invention, what is claimed as new, is:—

1. A wagon box having sideboards provided with notches, frames on the outer faces of the sideboards adjacent to said notches, supporting bars adapted to engage the notches and having vertical grooves coinciding with the outer faces of the sideboards, and plates adapted to engage the frames and the notches in the supporting bars to hold the latter against displacement.

2. A wagon box having sideboards provided with notches and exteriorly disposed frames adjacent thereto, extension sides hingedly connected with the sideboards, supporting bars adapted to engage the notches and to support the extension sides, said bars having vertical notches coinciding with the outer faces of the sideboards, and plates engaging the frames and the notches, said plates having flanges engaged by the extension members when the latter are downturned to rest upon the supporting bars.

3. A wagon box having sideboards provided with notches, the side walls of which are provided with vertical grooves, and obstructing members consisting of plates engaging said grooves and having flanges at their upper edges engaged by the extension sides.

4. A wagon box having sideboards and extension sides hingedly connected therewith, said sideboards being provided with notches at their upper edges, cross bars permanently connecting the lower edges of the sideboards, supporting bars adapted to engage the notches, said bars being of a length to extend beyond the sideboards and to support the extension sides when the latter are downturned, and a loose bottom member adapted to be supported upon the supporting bars intermediate the extension sides when the latter are downturned, said bottom member being of a width to fit between the sideboards of the box.

In testimony whereof I affix my signature in presence of two witnesses.

WILLIAM E. J. ANDERSON.

Witnesses:
J. A. ANDERSON,
DOLLIE STANLEY.

Copies of this patent may be obtained for five cents each, by addressing the "Commissioner of Patents. Washington, D. C."